US005318194A

United States Patent [19]

Wiese

[11] Patent Number: 5,318,194

[45] Date of Patent: Jun. 7, 1994

[54] OVERHEAD PACK DISPENSING APPARATUS

[75] Inventor: Lee R. Wiese, Upper Nyack, N.Y.

[73] Assignee: Henschel-Steinau, Inc., Englewood, N.J.

[21] Appl. No.: 991,868

[22] Filed: Dec. 16, 1992

[51] Int. Cl.$^5$ .............................................. B65G 59/00

[52] U.S. Cl. .................................... 221/123; 221/129; 221/131; 221/133; 221/195; 221/270; 221/272

[58] Field of Search ............... 221/123, 129, 131, 133, 221/195, 213, 215, 270, 272, 273

[56] References Cited

U.S. PATENT DOCUMENTS 2,289,325 7/1942 Harris .
2,947,445 8/1960 Potter .
3,074,593 1/1963 Krakauer et al. .
3,132,732 5/1964 Robillard .
3,204,816 9/1965 Zorner .
3,407,965 10/1968 Kuhlman .
3,893,589 7/1975 Mandell .............................. 221/123
3,902,633 9/1975 Spengler .
4,301,909 11/1981 Snavely ........................... 221/123 X
4,355,733 10/1982 Schoenkopf et al. ............... 221/123
4,423,827 1/1984 Guigan ................................ 221/129
4,546,901 10/1985 Buttarazzi ....................... 221/123 X

*Primary Examiner*—David H. Bollinger
*Attorney, Agent, or Firm*—Samuelson & Jacob

[57] ABSTRACT

An overhead pack dispensing apparatus includes a plurality of trays holding an extensive inventory of packs in an array of altitudinal stacks of packs with the lowermost pack of each stack in a field of lateral rows and longitudinal columns, the apparatus including a control system responsive to the selection of at least one pack, and a carriage carrying pickers for actuation by the control system to traverse the field and carry a picker for location beneath the selected pack such that a picker is located beneath at least one selected pack, enabling the selected pack to be picked from a stack and delivered by the carriage to a dispensing location.

21 Claims, 11 Drawing Sheets

OVERHEAD PACK DISPENSING APPARATUS

The present invention relates generally to the dispensing of items in the form of packs, such as packs of cigarettes, and pertains, more specifically, to an overhead pack dispensing apparatus for making available a relatively large and diverse inventory of packs at a point of purchase for selectively dispensing one or more packs of the available variety from the inventory with accuracy and dispatch.

Overhead storage and dispensing units have been in use for some time in making available a variety of packaged items, such as cigarette packs, at a point of purchase. These units usually are installed above a sales counter so as to enable easy access by a salesperson, both for quick retrieval of a particular item requested by a purchaser and for ease of restocking as the inventory of packs is depleted. Overhead units have been found to be quite effective in utilizing available space to maximum potential in storing the required varied inventory and rendering the inventory readily at hand for selection. However, with an increasing and ever-changing variety of items being dispensed from such overhead units, and the demand for dispensing selected items more quickly and with accuracy, manual picking of the selected items from the stored inventory has become more difficult and less effective.

The present invention provides an automated arrangement which retains essentially all of the advantages of an overhead pack dispensing unit insofar as having the ability to make available a large and varied inventory close at hand at a point of purchase, and attains further objects and advantages, some of which are summarized as follows: Makes available an even larger and more varied inventory of items to be dispensed, in a relatively compact space, at a point of purchase; delivers selected items with accuracy and dispatch, and with greater ease so as to require less effort by a salesperson or by a purchaser in order to complete a sale; promotes sales in that items are selected readily and delivered with facility to the appropriate sales location with minimal effort on the part of both the purchaser and the salesperson; enables greater security in that unauthorized removal of items is discouraged; provides a pleasing and attractive arrangement coupled with a high degree of utility in the dispensing and sale of pack items; enables ease of restocking to assure the presence of a complete inventory of the full variety of items to be made available for purchase; simplifies the keeping of inventory information for effective management; employs a generally simple mechanism for relatively low cost manufacture and widespread use; provides exemplary performance over a relatively long service life.

The above objects and advantages, as well as further objects and advantages, are attained by the present invention, which may be described briefly as dispensing apparatus for delivering at least one selected item from a plurality of items maintained in an array of stacks to a dispensing location,, the dispensing apparatus comprising: stacking means for holding the plurality of items in the stacks with the stacks extending between first and second ends, the second ends being placed in a field, and the stacks being arrayed with the second ends arranged in a pattern in the field; a receptor movable in juxtaposition with the field throughout the pattern in the field such that the receptor is selectively located in juxtaposition with any of the stacks; first actuator means for locating the receptor in juxtaposition with a selected stack corresponding to the stack in which the selected item is located; picker means carried by the receptor, the picker means being located on the receptor for placement in juxtaposition with a corresponding stack within which the selected item is located upon location of the receptor in juxtaposition with the selected stack; second actuator means for actuating the picker means upon placement of the picker means in juxtaposition with the corresponding stack to pick the selected item from the second end of the corresponding stack such that the selected item is received in the receptor; and transfer means for transferring the selected item from the receptor to the dispensing location.

The invention will be understood more fully, while still further objects and advantages will become apparent, in the following detailed description of a preferred embodiment of the invention illustrated in the accompanying drawing, in which.

Figure 1:
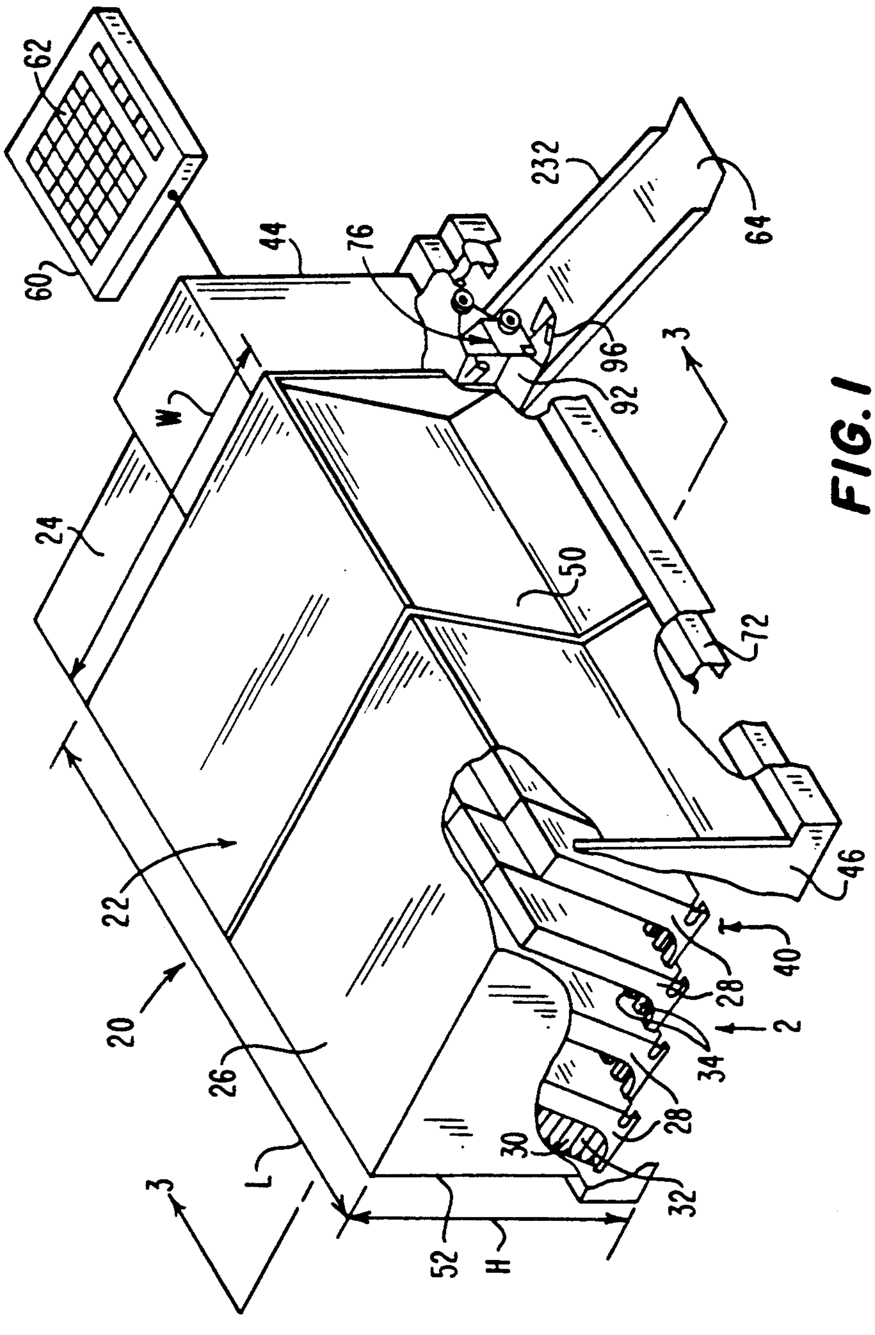
FIG. 1 is a perspective view of an overhead dispensing apparatus constructed in accordance with the present invention, with portions cut away to illustrate internal details.

Referring now to the drawing, and especially to FIG. 1 thereof, an overhead dispensing apparatus constructed in accordance with the invention is illustrated generally at 20 and is seen to include a housing 22 having a first compartment 24 within which is housed drive components and control components, and a second compartment 26 within which is housed a plurality of trays 28 extending in an essentially vertical direction, each tray 28 carrying items to be dispensed, the items being illustrated in the form of packs 30 of cigarettes held in a stack 32 within holders in the form of bays 34 in each tray 28. Each stack 32 extends altitudinally between an upper end 36 and a lower end 38 (see FIG. 3) and the trays 28 are arranged in an array which places the lower ends 38 of the stacks 32 within a field 40 accessible from beneath the second compartment 26 of the housing 22.

Figure 2:
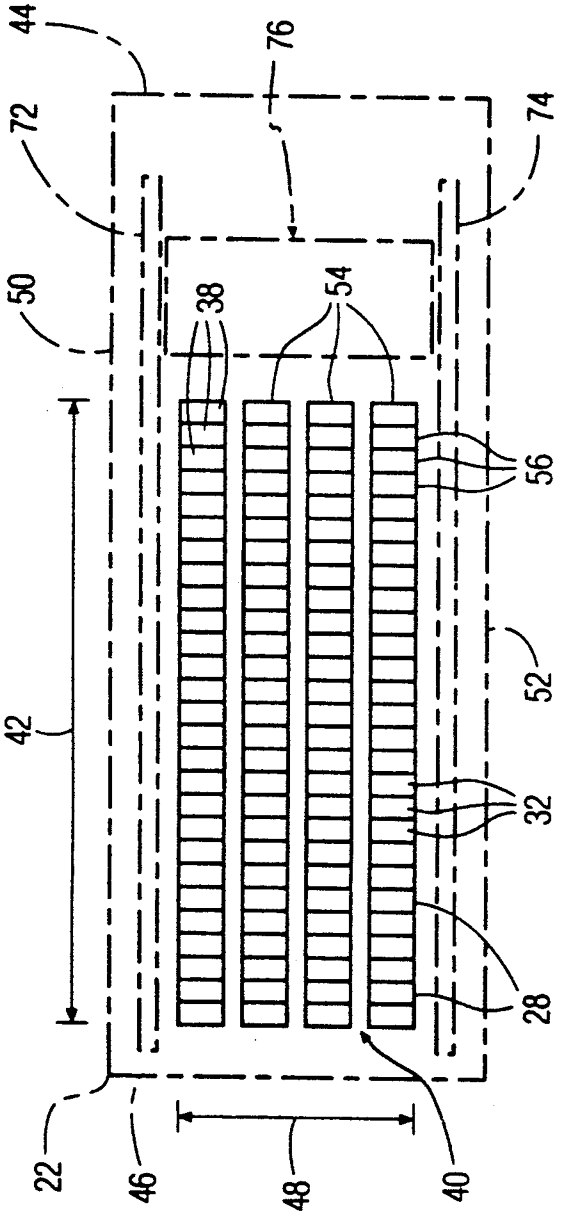
FIG. 2 is a diagrammatic depiction including a pattern of columns and rows of stacked items to be dispensed, as viewed in the direction of the arrow in FIG. 1.

As illustrated diagrammatically in FIG. 2, as well as in FIG. 1, field 40 has a longitudinal length 42 extending longitudinally along the housing 22 between opposite sides 44 and 46 of the housing 22, and a lateral width 48 extending laterally across the housing 22 between the front 50 and the rear 52 of the housing 22. The array of trays 28 places the lower ends 38 of stacks 32 within the field 40 in a pattern, here shown as an orthogonal grid including longitudinal columns 54 and lateral rows 56, all accessible from beneath the housing 40 by virtue of the second compartment 26 being open adjacent the field 40. In the illustrated embodiment, trays 28 are placed in twenty-seven rows 56 arranged in four columns 54 so as to provide one-hundred-eight stacks 32 of packs 30, thus enabling the selection of any one of up to one-hundred-eight varieties of cigarettes, from an inventory of about two-thousand-four-hundred packs 30, all held within a relatively compact space, the second compartment 26 typically having a length L of about seventy-two inches, a width W of about twenty-four inches, and a height H of about twenty-three inches.

Dispensing apparatus 20 includes selector means shown in FIG. 1 in the form of a keypad 60 so that an operator, such as a salesperson or a purchaser, can select the item to be dispensed. In the illustrated embodiment, the operator will select a particular variety of cigarette by depressing the appropriate key 62, or combination of keys 62, of keypad 60, and the apparatus 20 will be activated to deliver a pack 30 of the selected variety at a dispensing location 64. Any one of a variety of selectors are available to serve as selector means, rather than keypad 60, some examples of available selectors being a bar code reader, and a card or coupon reader.

Figure 3:
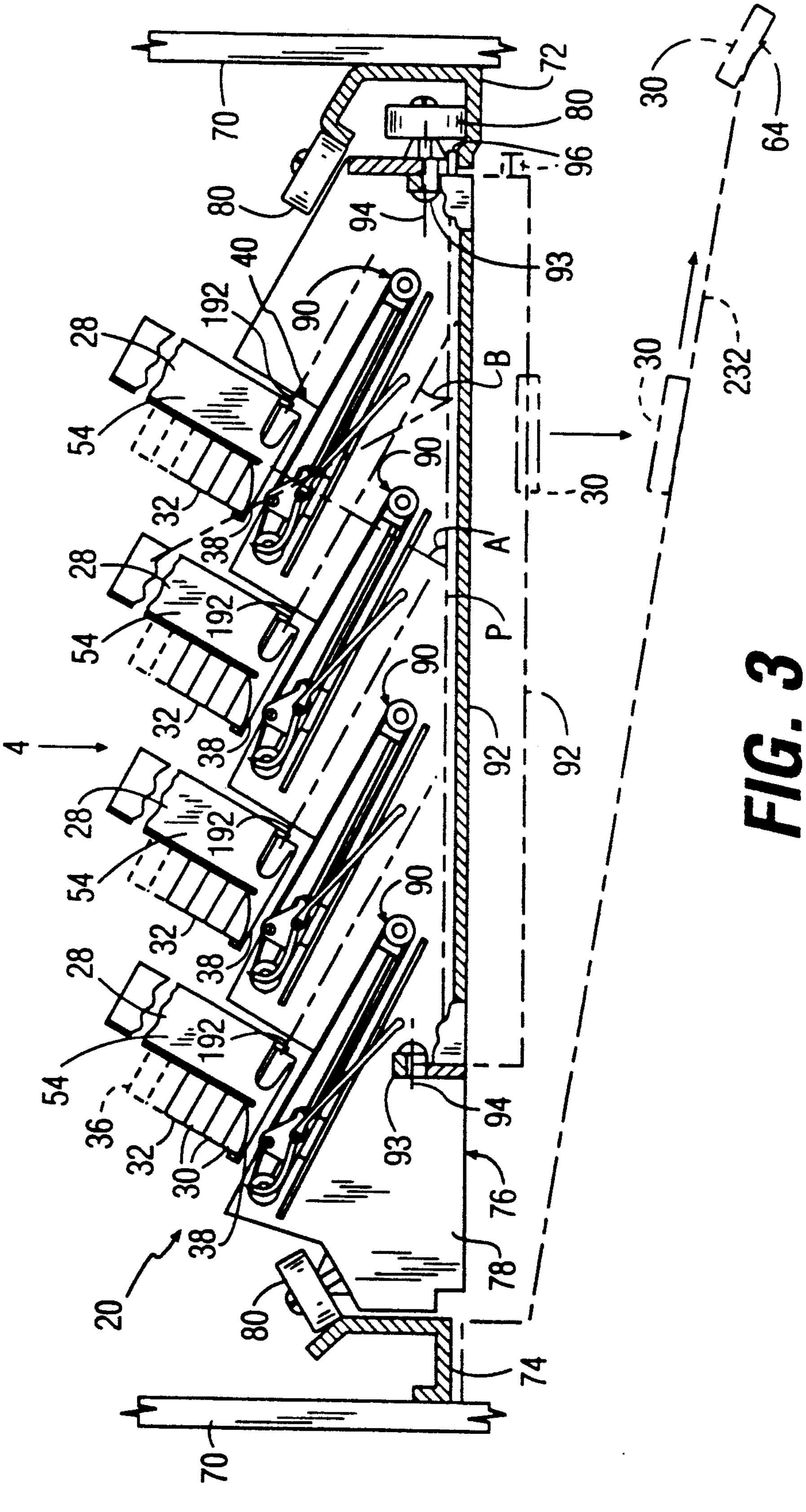
FIG. 3 is an enlarged, fragmentary elevational, partially diagrammatic cross-sectional view taken along line 3—3 of FIG. 1.
Figure 4:
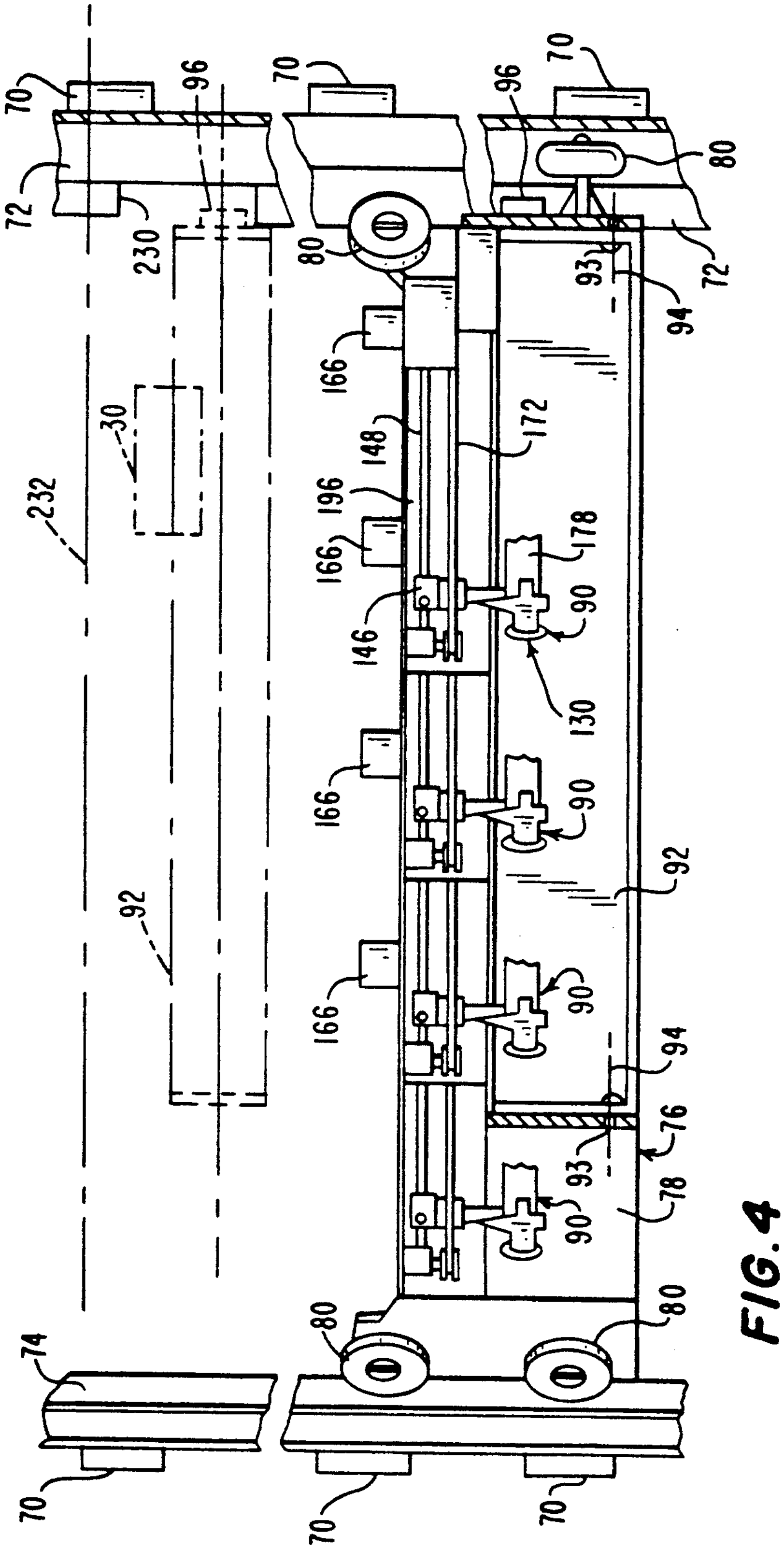
FIG. 4 is a fragmentary partially diagrammatic plan view taken in the direction of the arrow in FIG. 3.

Referring now to FIGS. 3 and 4, as well as to FIGS. 1 and 2, apparatus 20 is seen to include a frame 70 upon which the trays 28 are mounted. A pair of tracks 72 and 74 extend longitudinally along the frame 70, parallel to one another and juxtaposed, respectively, with the front 50 and the rear 52 of the second compartment 26 of housing 22 so as to be placed adjacent the front and the rear of the field 40. A carriage 76 includes a sub-frame 78 extending laterally across the field 40 and carrying wheels 80 which engage the tracks 72 and 74 so as to enable the carriage 76 to move longitudinally along the tracks 72 and 76, within a plane P, to traverse the area immediately below the field 40. Carriage 76 carries picker means in the form of four picker assemblies 90 associated with each of the four columns 54, respectively. Thus, as the carriage 76 moves along the tracks 72 and 74, each picker assembly 90 is moved in juxtaposition with the field 40, parallel to a counterpart column 54. A receptor is shown in the form of a collector shelf 92 mounted upon the carriage 76 by pins 93 for pivotal movement about a lateral axis 94 relative to the carriage 76 between a generally horizontal orientation, as seen in full lines, and a tilted position, as seen in phantom. A tab 96 at the front end of the shelf 92 rides along track 72 to maintain the shelf 92 in the horizontal orientation as the carriage 76 traverses the field 40 between a home position, adjacent the side 44 of the housing 22, and a far position, adjacent the other side 46 of the housing 22.

Figure 5:
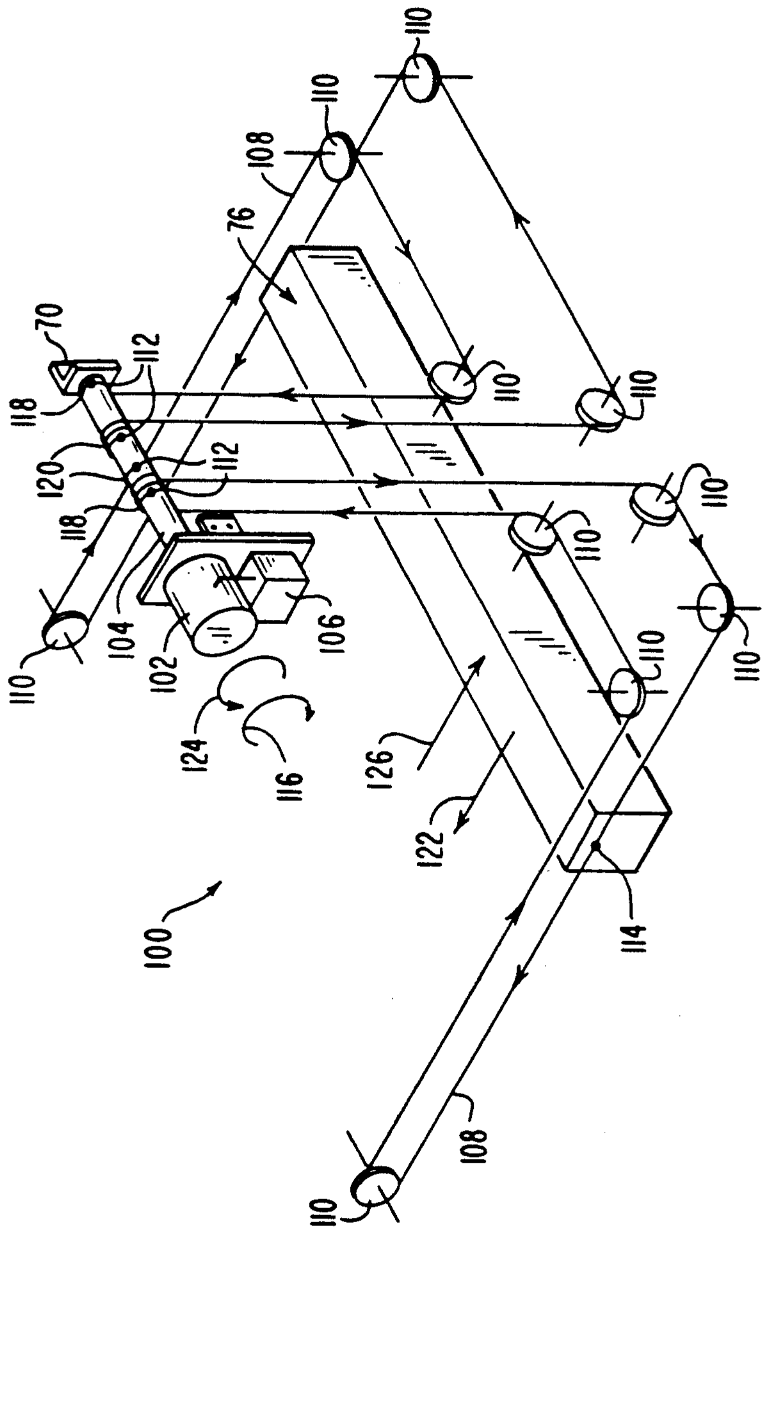
FIG. 5 is a diagrammatic illustration of the drive system of the apparatus.

Turning now to FIG. 5, a drive system is shown schematically at 100 for driving the carriage 76 through the aforesaid traverse. An actuator in the-form of carriage drive motor 102 is mounted on the frame 70 in the first compartment 24 of housing 22 and is coupled to a drive shaft 104 for rotation of the drive shaft 104 in response to a carriage drive motor controller 106. Drive cords 108 are routed around a series of pulleys 110 journaled on the frame 70 and are affixed to the drive shaft 104 at 122. The drive cords 108 are maintained in tension and are attached to carriage 76 at 114 such that upon rotation of the drive shaft in a clockwise direction 116, the drive cords 108 will be wound around the drive shaft 104 at 118, while being unwound at 120, to move the carriage 76 longitudinally in the direction 122 away from the home position and toward the far position. Upon rotation of the drive shaft in the counterclockwise direction 124, the drive cords 108 will be unwound from the drive shaft 104 at 120, and will be wound upon the drive shaft at 118 to move the carriage 76 in the longitudinal direction 126 away from the far position toward the home position. In this manner, the carriage 76 may be registered with any of the rows 56 in the field 40, the particular row 56 being determined by the selection made at the keypad 60, as will be explained below.

Figure 6:
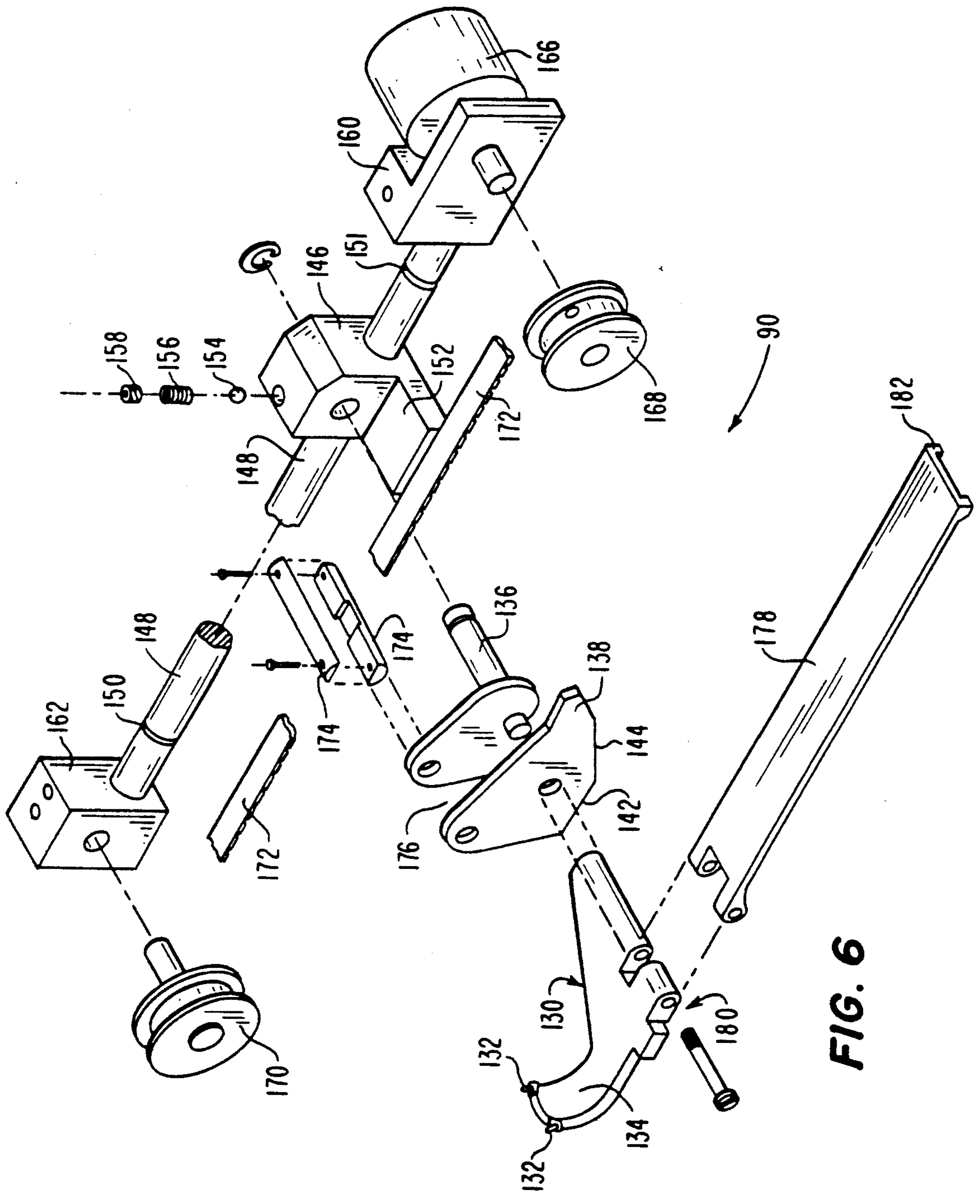
FIG. 6 is an exploded perspective view of a picker assembly of the apparatus.

As best seen in FIG. 6, each picker assembly 90 includes a picker 130 having prongs 132 carried at the end of a hooked pusher 134. The pusher 134 is attached to a pivot shaft 136 which, in turn, is affixed to a cam 138 and a retainer 140 for rotation of the pusher 134, the cam 138 and the retainer 140 with the pivot shaft 136. Cam 138 includes first and second flats 142 and 144 making an angle with one another. Pivot shaft 136 is journaled within a slide block 146 which slides along a fixed rod 148 between end positions defined by circumferential grooves 150 and 151 in the rod 148 and which carries a platform 152. When the slide block 146 is located at either end position, a detent element in the form of ball 154 is biased by a spring 156 and threaded plug 158 arrangement into a corresponding groove 150, 151 to hold the slide block 146 at the respective end position. Rod 148 is secured in place on the carriage 76 by end brackets 160 and 162 affixed to the carriage 76. A picker drive motor 166 is mounted on end bracket 160 and carries a drive pulley 168 which is coupled to an idler pulley 170, journaled for rotation in end bracket 162, by means of a drive belt 172. A clamp assembly 174 straddles the drive belt 172 and engages the cam 138 and the retainer 140 at 176 to secure the cam 142 to the drive belt 172. A ramp 178 is pivoted upon the picker 130 at 180 and includes a nose 182, all for purposes which will be described hereinafter.

Figure 7:
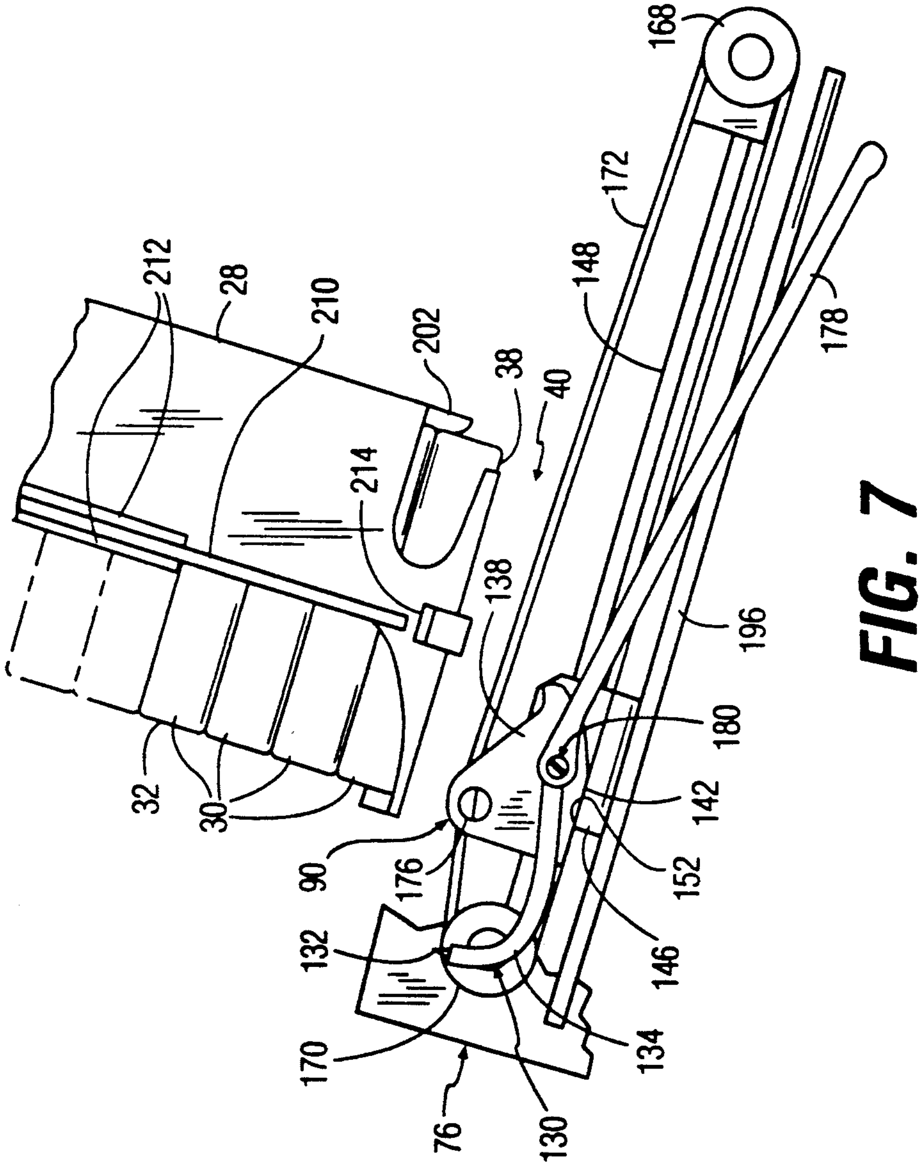
FIG. 7 is a somewhat diagrammatic fragmentary elevational view showing the operation of the picker assembly.
Figure 8:
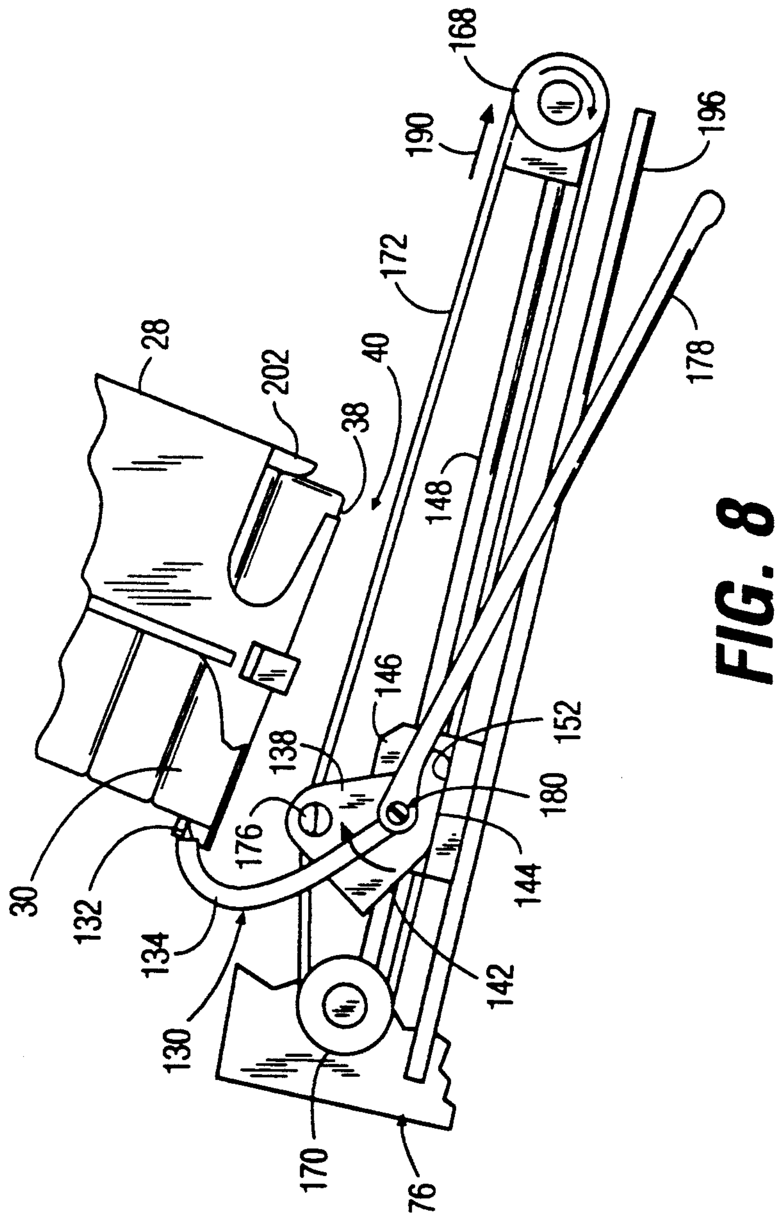
FIG. 8 is a view similar to FIG. 7, but with the component parts in another operating position.
Figure 9:
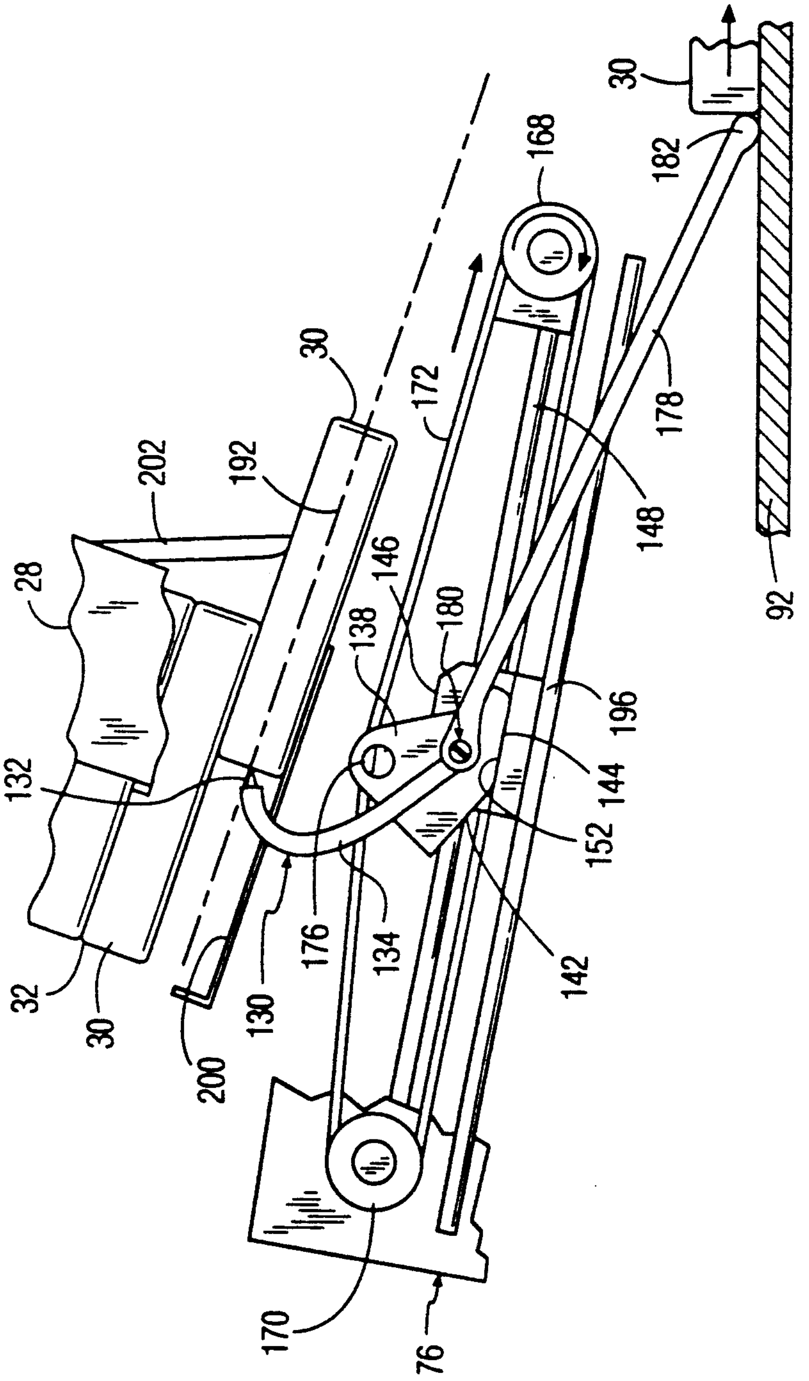
FIG. 9 is a view similar to FIG. 8, but with the component parts in still another operating position.

Referring now to FIGS. 7 through 9, in connection with FIG. 6, when the carriage 76 is in motion between the home position and the far position, the picker 130 is retracted and the carriage 76 moves freely beneath the field 40. In the retracted position of the picker 130, the slide block 146 is at the end position defined by groove 150 and is retained at that end position by the engagement of ball 154 within groove 150. The first flat 142 on cam 138 is engaged with the platform 152 of the slide block 146 to hold the picker 130 in the retracted position.

When the carriage 76 reaches the row 56 in which a selected pack 30 is located, the picker assembly 90 beneath that selected pack 30 is activated by actuating the picker drive motor 166 of that picker assembly 90 to drive the corresponding drive belt 172 forward, as indicated by arrow 190 in FIG. 8. Since movement of the slide block 146 is detained by the engagement of ball 154 in groove 150, the initial forward movement of the drive belt 172 will rotate cam 138 and pivot pin 136 in a clockwise direction, until the second flat 144 of cam 138 engages the platform 152 on the slide block 146. In this manner, the prongs 132 of pusher 134 are lifted and placed behind the selected pack 30 at the bottom end 38 of the corresponding stack 32. Continued forward movement of drive belt 172 will not rotate cam 138 beyond the point where the second flat 144 engages the platform 152 and will overcome the retention force of spring 156, thereby dislodging ball 154 from groove 150 and freeing the slide block 146 for advancement along the rod 148. As seen in FIG. 9, such translation of the slide block 146 enables the prongs 132 of pusher 134 to engage the selected pack 30 and push the selected pack 30 from the stack 32 and out of the tray 28, along a feed path 192. The slide block 146 is stabilized as the slide block 146 is translated along the rod 148 by virtue of the engagement of the slide block 146 with a stabilizing bed 196 affixed to the carriage 76 and extending beneath the path of travel of the slide block 146.

Once freed from the tray 28, the selected pack 30 will slide down the ramp 178 and fall onto collector shelf 92. Slide block 146 will arrive at the fully advanced end position defined by groove 151 and will be retained at that end position by engagement of the ball 154 within groove 151. The picker drive motor 166 then is actuated in a counterclockwise direction to drive the drive belt 172 in a rearward direction. The engagement of ball 154 within groove 151 detains movement of the slide block 146 until the cam 138 is rotated counterclockwise to bring the first flat 142 back into engagement with the platform 152 of the slide block 146 and to rotate the picker 130 to lower the prongs 132 of the pusher 134 so that the pusher 134 is returned to the retracted position beneath the field 40. Once the pusher 134 is so lowered, continued rearward movement of the drive belt 172 will retract the slide block 146 along the rod 148 to return the slide block 146 and the picker 130 to the position shown in FIG. 7. Since the picker 130 is lowered prior to retraction of the slide block 146, the prongs 132 and the pusher 134 will clear the lower ends 38 of the stacks 32 as slide block 146 is returned to the retracted end position.

Figure 10:
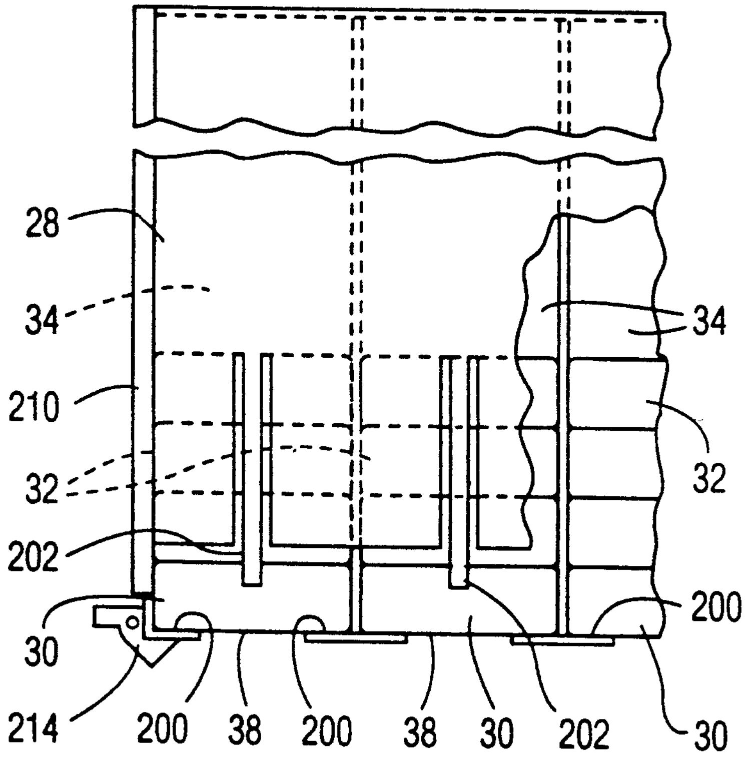
FIG. 10 is a fragmentary front elevational view of a portion of a stacking tray.

Turning now to FIG. 10, each tray 28 is seen to hold a plurality of stacks 32 by virtue of the bays 34 in the tray 28. The lowermost pack 30 in each stack 32 rests upon flanges 200 of the tray 28 located at the bottom of the stack 32. A resilient finger 202 is integral with the tray 28 and projects downwardly along each stack 32 to retain the lowermost pack 30 within the tray 28 and the stack 32. When the pusher 134 engages the lowermost pack 30 and pushes the pack 30 forward, as described above, the resilient finger 202 is displaced, as seen in FIG. 9, to enable the pack 30 to be pushed from the stack 32 for collection on the collector shelf 92. Each tray 28 may be removed from the second compartment 26 of the housing 22 for ready restocking. Thus, tray 28 includes an integral slide 210 which is received within a guide 212 (see FIG. 7) on the frame 70 so as to enable the tray 28 to be moved downwardly and out of the housing 22. A latch 214 retains the tray 28 in position in the frame 70 and is selectively released for removal and restocking of the tray 28.

Returning now to FIG. 3, the trays 28 are arranged to stagger the lower ends 38 of the stacks 32 in one column 54 altitudinally relative to corresponding stacks 32 in an adjacent column 54 so as to enable the columns 54 to be placed laterally closely adjacent one another, while still providing accessibility to the lower ends 38 by pickers 130. The laterally compact arrangement attained by such staggering not only conserves space, for the storage of a larger inventory of packs 30 in a smaller space, but increases security in that manual access for unauthorized withdrawal of packs 30 from the bottom of a stack 32 essentially is precluded. Thus, the aforesaid compact arrangement of the trays 28 enables adjacent columns 54 to be spaced apart laterally by no more than about one-quarter of an inch. In the preferred arrangement, the trays 28 are arranged to orient each stack 32 at an acute angle A to the plane P within which the carriage 76 moves as the carriage traverses the area beneath field 40. Thus, the lower ends 38 of adjacent stacks 32 in each row 56 are staggered altitudinally relative to one another so that the feed paths 192 for adjacent stacks 32 in each row 56 are spaced altitudinally with respect to one another a distance sufficient to enable the selected pack 30 withdrawn from a selected stack 32 to clear the lowermost end 38 of an adjacent stack 32 in the corresponding row 56 as the selected pack 30 is moved by the picker 130 along a corresponding feed path 192. Each picker assembly 90 likewise is oriented at an acute angle B to plane P, acute angle B being complementary to angle A. The forward tilt of the trays 28 and the picker assemblies 90 facilitates gravity feed of the picked packs 30, especially after a picked pack 30 is released from a tray 28 and travels freely on a downwardly oriented feed path 192 along a corresponding ramp 178, which ramp 178 leads the picked pack 30 over the adjacent picker assembly 90 and onto the collector shelf 92.

With all of the pickers 130 retracted beneath the field 40, the carriage 76 is returned to the home position, as seen in FIG. 1. Once the carriage 76 is at the home position, the tab 96 on the collector shelf 92 falls through a slot 230 in the track 72, allowing the collector shelf 92 to tilt about lateral axis 94 and discharge any pack 30 on the shelf 92 into a chute 232 which then delivers the selected pack 30 to the dispensing location 64. Thus, the tab 96 and slot 230 arrangement serves as ejector means for ejecting the selected pack 30 into the chute 232 and the chute 232 serves as a transfer means for transferring the ejected selected pack 30 to the dispensing location 64.

Figure 11:
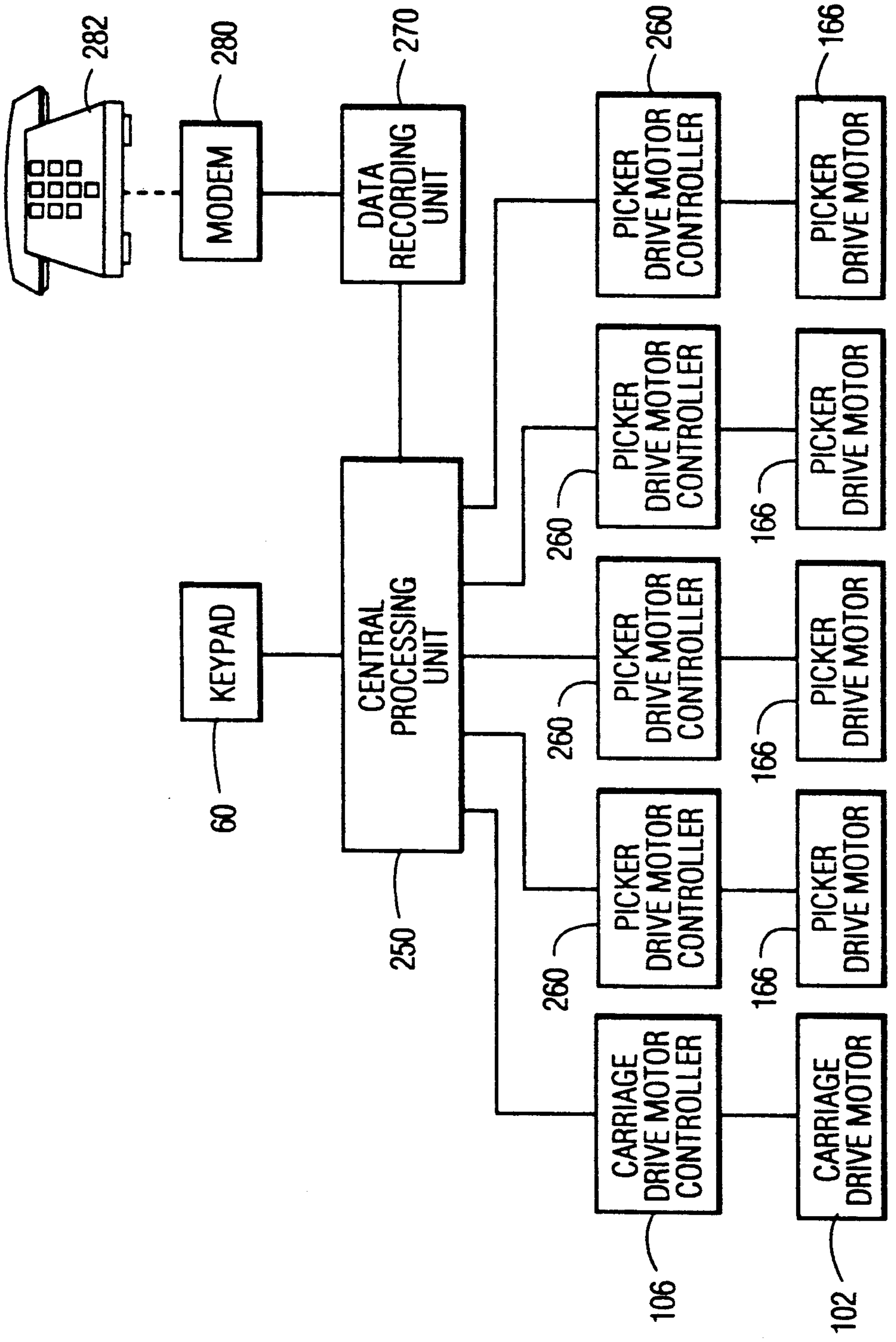
FIG. 11 is a schematic illustration of the control system of the dispensing apparatus.

Referring now to FIG. 11, the control system of dispensing apparatus 20 includes a central processing unit 250 which operates in response to the keypad 60 to activate the carriage drive motor controller 106 which, in turn, actuates the carriage drive motor 102 to move the carriage 76 along the columns 54 to the appropriate row 56, and then activates a picker drive motor controller 260 to actuate the appropriate picker drive motor 166 to pick a pack 30 from the appropriate column 54 in the row 56. It is noted that packs 30 may be picked simultaneously from more than one stack 32 in a row 56 merely by actuating more than one picker drive motor 166 while the carriage 76 is juxtaposed with that row 56. Additionally, the carriage 76 may be stopped sequentially at more than one row 56 as the carriage 76 traverses the field 40 to enable packs 30 to be picked from stacks 32 in different rows 56. Further, where multiple packs 30 are to be picked from a single stack 32, the respective picker assembly 90 is activated through a corresponding multiplicity of cycles of operation, while the carriage 76 remains stationary, so as to pick the desired number of packs 30 from the single stack 32. As each pack 30 is picked from the stack 32, in that mode of operation, and slides along ramp 178 toward the collector shelf 92, a previously picked pack 30 already on the collector shelf 92 is pushed forward along the collector shelf 92 by the nose 182 of the ramp 178, which nose 182 engages that previously picked pack 30 as the slide block 146 is advanced along the rod 148, as illustrated in FIG. 9, thereby clearing the way for the subsequently picked pack 30 to be received upon the collector shelf 92 without the picked packs 30 being piled up and possibly jammed between the collector shelf 92 and the trays 28. In such instances, the keypad 60 and central processing unit 250 serve as multiple selection means. A data recording unit 270 is connected with the central processing unit 250 to record each transaction, including the identity and the number of items dispensed, thereby facilitating inventory control and management of the supply of items to be dispensed. A modem 280 is connected with data recording unit 270 to enable the data to be accessed from a remote location 282. The arrangement of closely stacked items enables a relatively large number of items to be held in a compact space and, when coupled with the limited access provided by the arrangement of the field 40 beneath the housing 22 and the traversing carriage 76, enhances security in that manual access to the stacked items essentially is precluded.

It will be seen that the present invention attains several objects and advantages, including those summarized as follows: Makes available an even larger and more varied inventory of items to be dispensed, in a relatively compact space, at a point of purchase; delivers selected items with accuracy and dispatch, and with greater ease so as to require less effort by a salesperson or by a purchaser in order to complete a sale; promotes sales in that items are selected readily and delivered with facility to the appropriate sales location with minimal effort on the part of both the purchaser and the salesperson; enables greater security in that unauthorized removal of items is discouraged; provides a pleasing and attractive arrangement coupled with a high degree of utility in the dispensing and sale of pack items; enables ease of restocking to assure the presence of a complete inventory of the full variety of items to be made available for purchase; simplifies the keeping of inventory information for effective management; employs a generally simple mechanism for relatively low cost manufacture and widespread use; provides exemplary performance over a relatively long service life.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. Dispensing apparatus for delivering at least one selected item from a plurality of items maintained in an array of stacks to a dispensing location, the dispensing apparatus comprising:

a frame;

stacking means on the frame for holding the plurality of items in the stacks with the stacks extending essentially altitudinally between upper and lower ends, the lower ends being placed in a field having a longitudinal length and a lateral width, and the stacks being arrayed with the lower ends arranged in longitudinal columns and lateral rows, respectively, along the longitudinal length and the lateral width of the field;

a receptor movable along the frame in longitudinal directions beneath the field throughout the longitudinal length of the field, the receptor extending laterally across the lateral width of the field such that the receptor is selectively located beneath any of the rows;

first actuator means for locating the receptor beneath a selected row corresponding to the row in which the selected item is located;

picker means carried by the receptor, the picker means being located on the receptor for placement beneath a corresponding stack within which the selected item is located upon location of the receptor beneath the selected row;

second actuator means for actuating the picker means upon placement of the picker means beneath the corresponding stack to pick the selected item from the lower end of the corresponding stack such that the selected item is received in the receptor; and transfer means for transferring the selected item from the receptor to the dispensing location;

the stacking means including a holder for each stack;

the picker means including at least one picker for placement beneath the lower end of the corresponding stack in the selected row;

the actuator means moves the picker to advance the selected item from the corresponding stack along a feed path out of the stack, while the holder retains the remaining items of the corresponding stack in the corresponding stack;

the receptor moves generally within a plane located beneath the field; and the holders are arranged with the lower ends of adjacent stacks in each row staggered altitudinally relative to one another so that the feed paths for adjacent stacks in each row are spaced altitudinally with respect to one another a distance sufficient to enable the selected item from the selected stack to clear the lowermost end of an adjacent stack in the corresponding row as the selected item is moved by the picker along the corresponding feed path.

2. The invention of claim 1 wherein the holders are arranged to orient each stack at an acute angle to the plane within which the receptor moves.

3. The invention of claim 1 wherein:

the stacking means include a plurality of holders establishing a corresponding plurality of stacks in each row; and the picker means includes a plurality of pickers corresponding in number to the number of stacks in the plurality of stacks in each row such that a corresponding picker is available for each stack in each row.

4. The invention of claim 3 wherein the second actuator means includes a plurality of actuators, each picker being coupled to a corresponding actuator such that upon selection of the selected item a corresponding actuator is actuated to move the corresponding picker and advance the selected item along the corresponding feed path.

5. The invention of claim 4 wherein:

the frame includes tracks extending longitudinally along the length of the field;

the receptor includes a carriage engaged with the tracks for movement along the tracks beneath the field, between a home position and a selected position beneath the selected row.

6. The invention of claim 5 wherein:

the receptor includes a collector for receiving the selected item; and the transfer means includes a chute on the frame juxtaposed with the home position of the carriage and ejector means for ejecting the selected item from the collector into the chute upon arrival of the carriage at the home position.

7. The invention of claim 6 wherein the ejector means includes tilting means coupling the collector with the carriage and responsive to movement of the carriage into the home position to tilt the collector for ejection of the selected item from the collector into the chute.

8. The invention of claim 1 including:

selector means for selection of the selected item; and control means responsive to the selector means for controlling the first and second actuator means in response to selection of the selected item.

9. The invention of claim 8 wherein the selector means includes multiple selection means for enabling the selection of multiple selected items.

10. The invention of claim 8 including inventory means for recording inventory data pertaining to the selected items.

11. The invention of claim 8 wherein the holders are arranged to orient each stack at an acute angle to the plane within which the receptor moves.

12. The invention of claim 8 wherein:

the stacking means include a plurality of holders establishing a corresponding plurality of stacks in each row; and the picker means include a plurality of pickers corresponding to the plurality of stacks such that a corresponding picker is available for each stack in a row.

13. The invention of claim 12 wherein the second actuator means includes a plurality of actuators, each picker being coupled to a corresponding actuator such that upon selection of the selected item a corresponding actuator is actuated to move the corresponding picker and advance the selected item along the corresponding feed path.

14. The invention of claim 13 wherein:

the frame includes tracks extending longitudinally along the length of the field;

the receptor includes a carriage engaged with the tracks for movement along the tracks beneath the field, between a home position and a selected position beneath the selected row.

15. The invention of claim 14 wherein:

the receptor includes a collector for receiving the selected item; and the transfer means includes a chute on the frame juxtaposed with the home position of the carriage and ejector means for ejecting the selected item from the collector into the chute upon arrival of the carriage at the home position.

16. The invention of claim 15 wherein the ejector means includes tilting means coupling the collector with the carriage and responsive to movement of the carriage into the home position to tilt the collector for ejection of the selected item from the collector into the chute.

17. Dispensing apparatus for delivering at least one selected item from a plurality of items maintained in an array of stacks to a dispensing location, the dispensing apparatus comprising:

stacking means for holding the plurality of items in the stacks with each stack extending in a given direction between first and second ends, the second ends of the stacks being placed in a field, and the stacks being arrayed with the second ends arranged in a pattern in the field;

a receptor movable in juxtaposition with the field throughout the pattern in the field such that the receptor is selectively located in juxtaposition with any of the stacks;

first actuator means for locating the receptor in juxtaposition with a selected stack corresponding to the stack in which the selected item is located;

picker means carried by the receptor, the picker means being located on the receptor for placement in juxtaposition with a corresponding stack within which the selected item is located upon location of the receptor in juxtaposition with the selected stack;

second actuator means for actuating the picker means upon placement of the picker means in juxtaposition with the corresponding stack to pick the selected item from the second end of the corresponding stack such that the selected item is received in the receptor; and transfer means for transferring the selected item from the receptor to the dispensing location;

the pattern including a plurality of portions within the pattern, and the stacking means including a plurality of holders within each portion of the pattern, the plurality of holders establishing a corresponding plurality of stacks within each portion of the pattern; and the receptor moves adjacent the field, the picker means moves the selected item along a feed path out of the corresponding stack, and the stacks are arranged with the second ends of adjacent stacks in each portion of the pattern staggered in the given direction relative to one another so that the feed paths for adjacent stacks in each portion are spaced in the given direction with respect to one another a distance sufficient to enable the selected item from the selected stack to clear the second end of an adjacent stack in the corresponding portion of the pattern as the selected item is moved by the picker means along the corresponding feed path.

18. The invention of claim 17 wherein the picker means include a plurality of pickers corresponding in number to the number of stacks in the plurality of stacks within each portion of the pattern, such that a corresponding picker is available for each stack in each portion of the pattern, and the second actuator means includes a plurality of actuators, each picker being coupled to a corresponding actuator such that upon selection of the selected item a corresponding actuator is actuated to move the corresponding picker and advance the selected item out of the corresponding stack.

19. The invention of claim 18 wherein the pattern comprises an orthogonal grid including longitudinal columns and lateral rows, and the stacks extend altitudinally relative to the columns and rows.

20. The invention of claim 19 wherein the receptor moves generally within a plane located altitudinally beneath the field, the picker means moves the selected item along a feed path out of the corresponding stack, each portion of the pattern being located in a corresponding row and the given direction being an altitudinal direction such that the stacks are arranged with the second ends of adjacent stacks in each row staggered altitudinally relative to one another so that the feed paths for adjacent stacks in each row are spaced altitudinally with respect to one another a distance sufficient to enable the selected item from the selected stack to clear the second end of an adjacent stack in the corresponding row as the selected item is moved by the picker means along the corresponding feed path.

21. The invention of claim 20 wherein the stacks are oriented at an acute angle to the plane within which the receptor moves.

* * * * *